US009858153B2

(12) United States Patent
Dart et al.

(10) Patent No.: US 9,858,153 B2
(45) Date of Patent: Jan. 2, 2018

(54) SERVICE-BASED BACKUP DATA RESTORING TO DEVICES

(71) Applicant: Microsoft Technology Licensing, LLC, Redmond, WA (US)

(72) Inventors: Scott E. Dart, Bellevue, WA (US); Sara L. Yang, Fremont, CA (US); Antonia C. Blume, Seattle, WA (US); Benjamin N. Truelove, Lynnwood, WA (US); Varun Ramesh Mani, Redmond, WA (US); Benjamin Salim Srour, Seattle, WA (US); Elena Alina Angelescu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 710 days.

(21) Appl. No.: 13/905,097

(22) Filed: May 29, 2013

(65) Prior Publication Data

US 2014/0359051 A1   Dec. 4, 2014

(51) Int. Cl.
*G06F 15/167* (2006.01)
*G06F 11/14* (2006.01)
*H04L 29/08* (2006.01)

(52) U.S. Cl.
CPC ...... *G06F 11/1451* (2013.01); *H04L 67/1097* (2013.01); *G06F 11/1464* (2013.01); *G06F 11/1469* (2013.01)

(58) Field of Classification Search
CPC ............ G06F 11/1451; G06F 11/1464; G06F 11/1469; G06F 21/6218; G06F 21/6272;
(Continued)

(56) References Cited

U.S. PATENT DOCUMENTS 5,479,602 A * 12/1995 Baecker .............. G06F 3/04817
   345/473
8,209,298 B1   6/2012 Anglin et al.
(Continued)

FOREIGN PATENT DOCUMENTS

WO   2004/034286 A1   4/2004
WO   2011/126478 A1   10/2011

OTHER PUBLICATIONS http://whatis.techtarget.com/definition/display; Margaret Rouse, What is Display, Apr. 2005.*
(Continued)

*Primary Examiner* — Tauqir Hussain

(57) ABSTRACT

A user of a device has an account with a service that stores copies of common data that is automatically made available to any of the user's devices and also stores copies of device-specific data that is available to the user on particular user-selected devices but is not automatically made available to all of the user's devices. A set of backed up devices can be displayed to the user of a particular device with various information describing the devices to facilitate user selection of a device, such as a visual representation of the type of the device that was backed up, a visual representation of a desktop or start screen display of the device that was backed up, and so forth. The user can select one of the displayed devices, and in response have the backed up device-specific data for the selected device copied to the particular device.

20 Claims, 6 Drawing Sheets

(58) Field of Classification Search
CPC ......... G06F 2221/2107; H04L 67/1097; H04L 63/0428; H04L 9/0816
USPC ........................................................ 709/216
See application file for complete search history.

(56) References Cited

U.S. PATENT DOCUMENTS

| | | | | |
|---|---|---|---|---|
| 9,025,900 | B1* | 5/2015 | Tsao | G06F 17/3028 382/248 |
| 9,235,312 | B2* | 1/2016 | Dura | G06F 3/0481 |
| 2008/0034018 | A1* | 2/2008 | Cisler | G06F 3/04847 |
| 2009/0100158 | A1* | 4/2009 | Sonkin et al. | 709/221 |
| 2010/0083279 | A1* | 4/2010 | Kowal et al. | 719/315 |
| 2011/0246627 | A1* | 10/2011 | Kern | G06F 9/5072 709/220 |
| 2011/0258481 | A1* | 10/2011 | Kern | G06F 11/1484 714/4.1 |
| 2011/0258621 | A1* | 10/2011 | Kern | G06F 9/5072 718/1 |
| 2012/0084261 | A1 | 4/2012 | Parab | |
| 2012/0150808 | A1* | 6/2012 | Hubner et al. | 707/652 |
| 2012/0174212 | A1* | 7/2012 | Dart et al. | 726/19 |
| 2013/0069953 | A1* | 3/2013 | Hautala | G06F 3/04817 345/467 |
| 2013/0234951 | A1* | 9/2013 | Kim | G06F 1/1652 345/173 |
| 2013/0305039 | A1* | 11/2013 | Gauda | G06F 21/6218 713/153 |
| 2013/0339527 | A1* | 12/2013 | Chowdhry | H04L 29/08144 709/226 |
| 2014/0188808 | A1* | 7/2014 | Wolf et al. | 707/654 |
| 2014/0195491 | A1* | 7/2014 | Ma et al. | 707/652 |
| 2014/0289202 | A1* | 9/2014 | Chan | G06F 9/54 707/652 |
| 2014/0289203 | A1* | 9/2014 | Chan | G06F 17/3082 707/652 |

OTHER PUBLICATIONS

"ICloud: Backup and Restore Overview", Retrieved at<<http://support.apple.com/kb/HT4859>>, Dec. 5, 2012, pp. 3.

Edmonds, Rich, "Backing Up and Restoring Personal Data in Windows Phone 8", Retrieved at<<http://www.wpcentral.com/backing-and-restoring-personal-data-windows-phone-8>>, Nov. 9, 2012, pp. 11.

"Automatic Data Backup", Retrieved at<<http://www.crashplan.com/>>, Retrieved Date: Mar. 6, 2013, pp. 3.

"Disaster Recovery System Administration Guide for Cisco Unified Communications Manager Release 7.0(1)", Retrieved at<<http://www.cisco.com/en/US/docs/voice_ip_comm/cucm/drs/7_0_1/DRS_CUCM/drsag701.html>>, 2008, pp. 14.

"New Backup and Recovery Software 'Reduplicates' Backup Data for Optimal Recovery Times", Retrieved at<<http://www.continuitycentral.com/news05595.html>>, Feb. 4, 2011, pp. 2.

"Backup as a Service (BaaS)", Retrieved at<<http://www.macquarietelecom.com/Portals/0/Downloads/Brochures/Backup_as_a_Service_BaaS_Brochure.pdf>> Retrieved Date: Oct. 3, 2012, pp. 3.

"Backup and Restore for SharePoint by AvePoint", Retrieved at<<http://www.sharepointreviews.com/component/content/article/66-sharepoint-backup-recovery/205-DocAve-Backup-and-Recovery-for-SharePoint.html>>, Retrieved Date: Mar. 6, 2013, pp. 3.

"International Search Report & Written Opinion for PCT Patent Application No. PCT/US2013/060493", dated Jun. 30, 2014, Filed Date: Sep. 19, 2013, 14 Pages.

* cited by examiner

SERVICE-BASED BACKUP DATA RESTORING TO DEVICES

BACKGROUND

As computing technology has advanced, the number of computing devices people use has increased. For example, where people once had a single desktop computer, now they oftentimes have a laptop computer, smartphone, tablet computer, and so forth. Furthermore, as the computing power of available devices increases while the price remains the same or decreases, the frequency with which these devices are changed by users has also increased. While these advances provide many benefits to users, they are not without their problems. One such problem is that users oftentimes install multiple programs on their devices and configure particular settings on their devices that are repeated by the users each time they purchase a new computing device. Such re-installing and re-configuring can be time consuming and settings can be forgotten by users, which leads to an unpleasant and frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an indication of multiple computing devices that have been previously backed up is provided to a particular computing device. The indication includes for each of the multiple computing devices device metadata that allows the different ones of the multiple computing devices to be distinguished from one another, the device metadata including data that is backed up from the device. A user selection of one of the multiple computing devices is received from the particular computing device, and device-specific data associated with the user selected computing device is provided to the particular computing device.

BRIEF DESCRIPTION OF THE DRAWINGS

The same numbers are used throughout the drawings to reference like features.

DETAILED DESCRIPTION

Service-based backup data restoring to devices is discussed herein. A user of a computing device has an account with a service that is remote from the computing device. Various data on the computing device can be copied to the remote service and associated with an identifier of the user (e.g., an account name or identifier), and this data includes both common data and device-specific data. The common data refers to data that is automatically made available to any of the user's computing devices when he or she logs into his or her account from such a device. The device-specific data refers to data that is backed up by the remote service for the user, and is available to the user on particular user-selected devices but is not automatically made available to all of the user's computing devices when he or she logs into his or her account from such a device.

The user can have device-specific data restored from the remote service to a computing device of the user, such as restored to a newly acquired computing device. The user can log into his or her account from a particular computing device and have displayed to him or her a set of backed up devices that can be restored to the particular computing device. The set of backed up devices are displayed with various metadata describing the devices to facilitate user selection of a device, such as a visual representation of the type of the computing device that was backed up, a visual representation of a desktop or start screen display of the computing device that was backed up, and so forth. The user can select one of the displayed devices, and in response the device-specific data for the user selected device is copied to the particular computing device. Due to the user logging into his or her account, the common data is also copied to the particular computing device. Thus, by virtue of the user logging into his or her account and selecting one of the devices he or she has backed up, the user's newly acquired device is automatically populated with the device-specific data for the selected device as well as the common data for the user.

Figure 1:
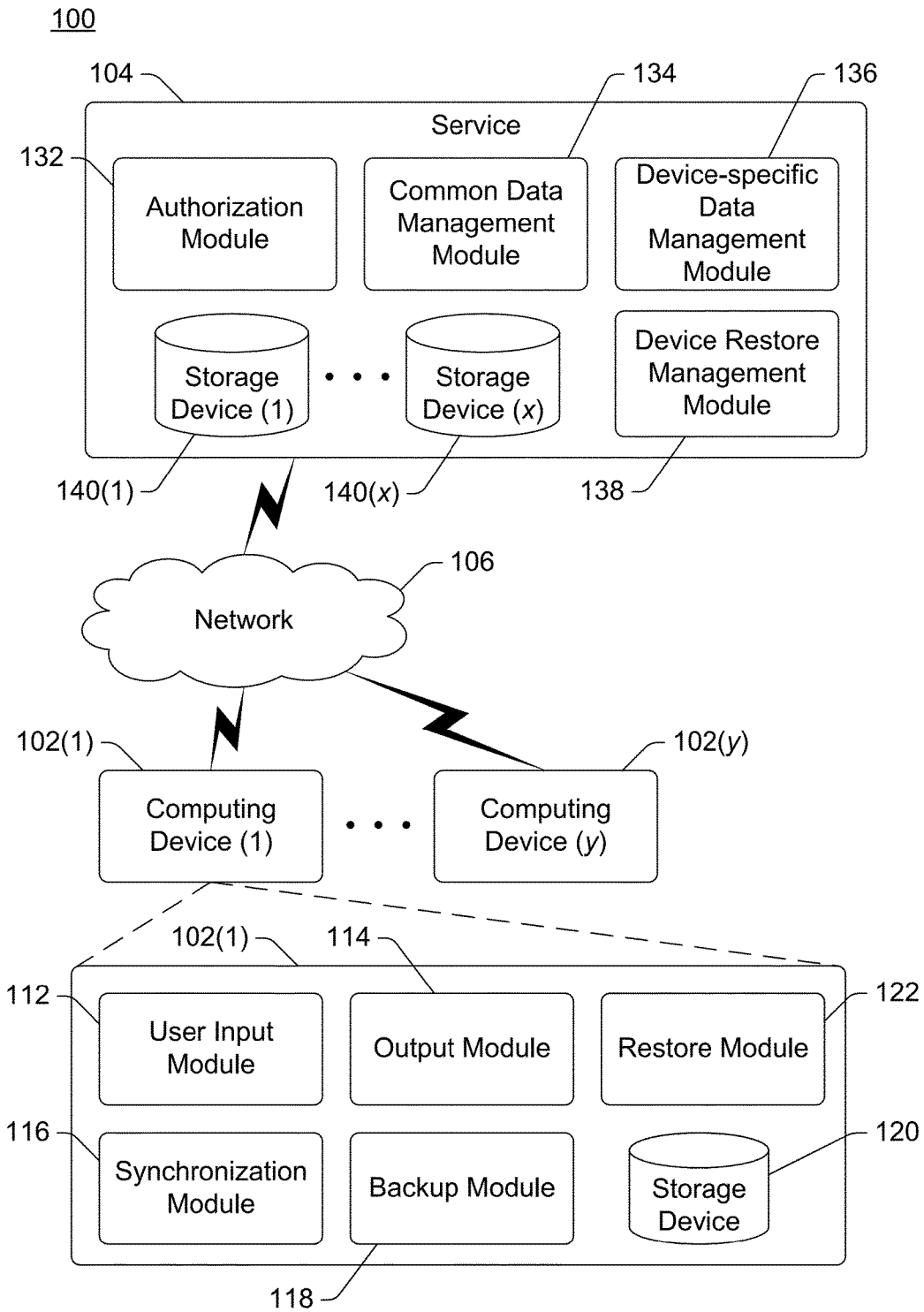
FIG. 1 illustrates an example system implementing the service-based backup data restoring to devices in accordance with one or more embodiments.

FIG. 1 illustrates an example system 100 implementing the service-based backup data restoring to devices in accordance with one or more embodiments. The system 100 includes one or more computing devices 102(1), . . . , 102(y) that can communicate with a service 104 via a network 106. The network 106 can be a variety of different networks, including the Internet, a local area network (LAN), a public telephone network, an intranet, other public and/or proprietary networks, combinations thereof, and so forth. The service 104 can also be referred to as a remote service because the service 104 is not included as part of the computing devices 102, but rather is accessed by the computing devices 102 via the network 106.

Each computing device 102 can be a variety of different types of devices, such as a physical device or a virtual device. For example, a computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. A computing device 102 can also be a virtual device, such as a virtual machine running on a physical device. A virtual machine can be run on any of a variety of different types of physical devices (e.g., any of the various types listed above). Thus, each computing device 102 may range from a full resource device with substantial memory and processor resources (e.g., personal computers, game consoles) to a low-resource device with limited memory and/or processing resources (e.g., traditional set-top boxes, handheld game consoles). Different computing devices 102 can be the same or different types of devices.

The service 104 can be implemented using any of a variety of different computing devices capable of storing data. Similar to the discussion of computing device 102, the service 104 can be implemented using one or more of a variety of different types of devices, ranging from full resource devices with substantial memory and processor resources to a low-resource device with limited memory and/or processing resources.

An example computing device 102(1) is illustrated in additional detail. A single computing device 102(1) is shown in additional detail to avoid cluttering the drawings, and it should be noted that other computing devices include similar modules. The computing device 102(1) includes a user input module 112, an output module 114, a synchronization module 116, a backup module 118, a storage device 120, and a restore module 122.

The user input module 112 receives user inputs from a user of the computing device 102(1). User inputs can be provided in a variety of different manners, such as by pressing one or more keys of a keypad or keyboard of the device 102(1), pressing one or more keys of a controller (e.g., remote control device, mouse, track pad, etc.) of the device 102(1), pressing a particular portion of a touchpad or touchscreen of the device 102(1), making a particular gesture on a touchpad or touchscreen of the device 102(1), and/or making a particular gesture on a controller (e.g., remote control device, mouse, track pad, etc.) of the device 102(1). User inputs can also be provided via other physical feedback input to the device 102(1), such as tapping any portion of the device 102(1), an action that can be recognized by a motion detection or other component of the device 102(1) (such as shaking the device 102(1), rotating the device 102(1), bending or flexing the device 102(1), etc.), and so forth. User inputs can also be provided in other manners, such as via voice or other audible inputs to a microphone, via motions of hands or other body parts observed by an image capture device, and so forth.

The output module 114 generates, manages, and/or outputs content for display, playback, and/or other presentation. This content can be created by the output module 114 or obtained from other modules or programs of the computing device 102(1) and/or the service 104. This content can be, for example, a display or playback portion of a user interface (UI), such as a UI displaying visual representations of a set of possible backup devices from which data can be restored as discussed in more detail below. The content can be displayed or otherwise played back by components of the computing device 102(1) (e.g., speakers, interactive display devices, etc.). Alternatively, the output module 114 can generate one or more signals that are output to other devices or components (e.g., speakers, display devices, etc.) that are separate from the computing device 102(1).

The storage device 120 can be implemented as any of a variety of different storage and/or memory devices, such as a magnetic disk, an optical disk, Flash memory or other solid state memory, volatile memory (e.g., RAM), combinations thereof, and so forth. The storage device 102 is used by the computing device 102(1) and is separate from the service 104, and thus is also referred to as a local storage device. Various types of data for the computing device 102(1) are stored on the storage device 120. These types of data can include user data, program data, program files (e.g., source code, binaries, scripts, etc.), libraries, configuration settings (e.g., for an operating system, for an application, etc.), and so forth. This data (or subsets of this data, such as subsets identified by a user of the computing device 102(1)) is copied to the service 104 for storage and optionally copied to other computing devices 102 of the user as discussed in more detail below.

The synchronization module 116, the backup module 118, and the restore module operate in conjunction with modules of the service 104 to copy data between the service 104 and the computing device 102. The copied data can be classified as common data or device-specific data. Different types of data can have different classifications, and particular data of the same type can have different classifications. The classification of particular data can be made in various manners as discussed below, and can change over time.

The service 104 includes an authorization module 132, a common data management module 134, a device-specific data management module 136, a device restore management module 138, and multiple (x) storage devices 140. Each storage device 140 can be implemented as one or more of any of a variety of different storage and/or memory devices analogous to the storage device 120.

A user of a computing device 102 logs into the service 104, also referred to as the computing device 102 logging into the service 104. The authorization module 132 authenticates a user of the service 104 when he or she logs into the service 104. One or more of various different authentication mechanisms can be used, such as passwords, personal identification numbers (PINs), smartcards, one-time passwords or codes (e.g., sent to a user's phone number or email account and to be entered by the user to the service 104), gestures or patterns input on a touchscreen, and so forth. In response to the user being authenticated, the user is permitted access to his or her account and data associated with the user account can be copied to and from the service 104. In response to the user not being authenticated, the user is not permitted access to his or her account and data associated with the user account cannot be copied to and/or from the service 104.

Common data can be associated with a user account, also referred to as being associated with the user or user identifier. Common data refers to data that is made available to and can be copied to any of the user's computing devices when he or she logs into his or her account on the service 104 from such a computing device. The synchronization module 116 manages synchronization of common data for the computing device 102(1) with the service 104, and the common data management module 134 manages synchronization of common data for the service 104 with the computing devices 102. Synchronization of common data refers to automatically keeping copies of the common data at both the service 104 and the computing device 102(1)—the user need not manually copy data between the service 104 and the computing device 102(1). Changes to common data at the computing device 102(1) are identified by the synchronization module 116, and indications of the changes are communicated to the service 104. In response to such indications, the common data management module 134 stores the changed data in a storage device 140 as associated with the user account under which the computing device 102 is logged into the service 104. Changes to common data can also be received by the service 104 from other computing devices 102 and stored in a storage device 140 as associated with the user account under which the computing device 102 is logged into the service 104. The common data management module 134 communicates indications of such changes to the synchronization module 116, which stores the changed data in the storage device 120 as associated with the user account under which the computing device 102 is logged into the service 104. The changes to data can be modifications of data, creation of new data, deletion of data, and so forth. The indications can be entire files that are changed, portions of files, other identifiers of data, and so forth.

Device-specific data can also be associated with a user account, also referred to as being associated with the user or user identifier. Device-specific data refers to data that is backed up by being saved at the service 104 as associated with the user account (also referred to as backup data), but is not automatically made available to all devices associated with the user. Rather, indications of the device-specific data can be provided to a computing device in response to a user selection to restore the device-specific data for one particular computing device 102 to another (or the same) computing device 102. Thus, rather than automatically copying the device-specific data to a computing device 102 as is done with the common data, the device-specific data is copied to a computing device 102 in response to a user selection to do so.

Changes to device-specific data at the computing device 102(1) are identified by the backup module 118, and indications of the changes are communicated to the service 104. In response to such indications, the device-specific data management module 136 stores the changed data in a storage device 140 as associated with the user account under which the computing device 102 is logged into the service 104.

A user of a computing device 102 can provide a user input to the computing device 102 requesting that device-specific data be copied to the computing device 102. This copying of device-specific data to a computing device is also referred to as restoring the computing device or restoring the device-specific data to the computing device. The computing device 102 to which the device-specific data is restored can be the same computing device 102 from which the device-specific data was communicated to the service 104, or alternatively another computing device 102. The user can be presented with an option to select from multiple different computing devices for which device-specific data has been copied to the service 104 (computing devices that have been previously backed up). In response to a user input selecting a computing device from which device-specific data is to be restored, the device restore management module 138 obtains the device-specific data associated with the user account from one or more storage devices 140 and communicates the device-specific data to the restore module 122. The restore module 122 stores the received device-specific data in the storage device 120 as associated with the user account under which the computing device 102 is logged into the service 104.

Which data associated with a user account is classified as common data and which is classified as device-specific data can vary and can be determined in a variety of different manners. Which data associated with a user account is classified as common data and which data is classified as device-specific data can also change over time, and can be different for different computing devices and/or different users of the same computing device. In one or more embodiments, a user of the computing device 102 provides user inputs identifying particular data as common data and particular data as device-specific data. This identifying can be performed in different manners, such as by a user selecting a configuration option (e.g., displayed by menu, dialog box, etc.) associated with particular types of data or subsets of particular types of data, by selecting to store particular data in a location (e.g., a directory or folder) associated with common data or device-specific data, and so forth. Default settings can optionally be set for which data is classified as common data and which data is classified as device-specific data, such as by a developer of an operating system running on the computing device 102 (e.g., and providing the synchronization module 116 and the backup module 118), by an administrator of the computing device 102, and so forth. An operating system or other module of the computing device 102 may also prohibit certain data from being classified as common data. For example, some operating system settings (e.g., settings that are used by a computing device that is a phone but would not be used for other computing device) may be restricted to being classified as device-specific data and prohibited from being classified as common data.

In one or more embodiments, application data and operating system settings are device-specific data by default, while data stored in a particular one or more directories or folders (e.g., that are associated with the service 104) are common data. Application data refers to any of various data than an application running on the computing device 102 may store other than user data files. For example, application data can include various operational and control data for the application, configuration settings for the application (e.g., particular menu or toolbar settings), and so forth. In one or more embodiments, application data for different applications (e.g., application data in different folders or directories) is considered different collections of device-specific data, so each application has its own collection of device-specific data.

Operating system settings are configuration settings for an operating system running on the computing device 102, such as display settings (e.g., colors, background pictures, etc.), input device settings (e.g., various configuration settings for a trackpad, mouse, etc.), output device settings (e.g., display resolutions, audio volumes or tones, etc.), and so forth. In one or more embodiments, different operating system settings are grouped together into collections. The settings can be grouped into different collections in different manners, such as one collection being display settings, one collection being input device settings, one collection being output device settings, and so forth. Alternatively, coarser or finer granularity groupings can be used, such as one collection being trackpad settings, one collection being mouse settings, one collection being external monitor settings, and so forth. The different collections can be identified separately as common data or device-specific data. Alternatively, rather than operating system settings being grouped together into collections, individual operating system settings can be identified separately as common data or device-specific data.

It should be noted that although common data and device-specific data are discussed herein, data can also be assigned other classifications and may be neither common data nor device-specific data. For example, some data may be classified as local data that remains in the storage device 120 and is not copied to the service 104.

Figure 2:
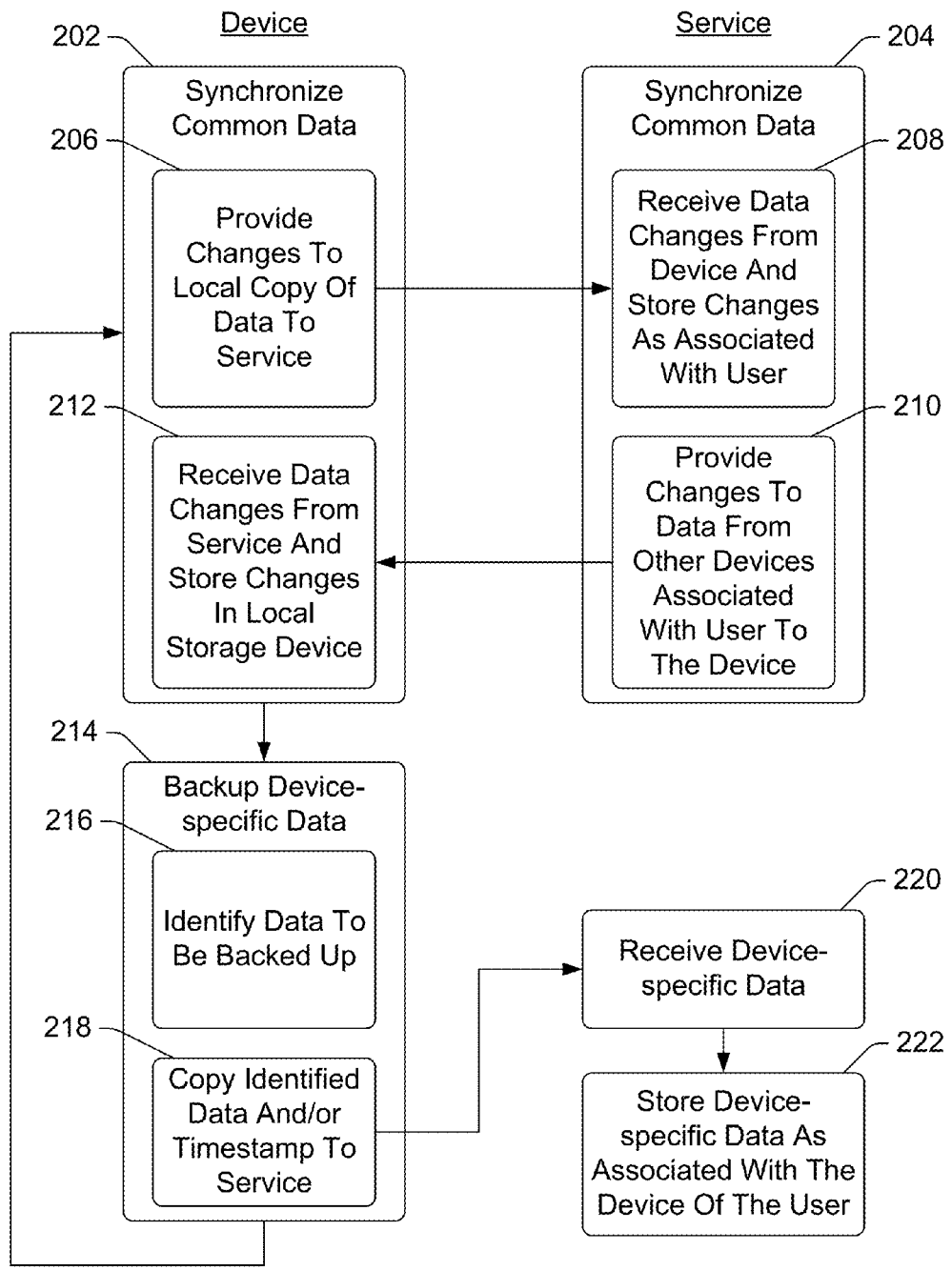
FIG. 2 is a flowchart illustrating an example process for synchronizing and backing up data in accordance with one or more embodiments.

FIG. 2 is a flowchart illustrating an example process 200 for synchronizing and backing up data in accordance with one or more embodiments. The process 200 can be implemented in software, firmware, hardware, or combinations thereof. Acts of the process 200 illustrated on the left-hand side of FIG. 2 are carried out by a device, such as a device 102 of FIG. 1. Acts of process 200 illustrated on the right-hand side of FIG. 2 are carried out by a service, such as the service 104 of FIG. 1. The process 200 is shown as a set of acts and is not limited to the order shown for performing the operations of the various acts. The process 200 is an example process for synchronizing and backing up data; additional discussions of synchronizing and backing up data are included herein with reference to different figures.

In the process 200, common data is synchronized by the device and the service (acts 202 and 204). Common data is synchronized by the device providing changes to the local copy of data to the service (act 206), which receives and stores the changes as associated with the user (act 208), and by the service providing to the device changes to data received from other devices associated with the user (act 210), the device receiving and storing the changes as part of its local copy of data (act 212). The local copy of the data refers to the data stored in the storage device of the computing device (e.g., the storage device 120 of FIG. 1).

The synchronization of common data in acts 202 and 204 is ongoing, with acts 202 and 204 being repeated. Changes to data can be provided to the device or the service at different times or in response to different events, such as in response to detection of a change in the local copy of data at the device, in response to receipt of an indication of a change in data received from another device associated with the user, at regular or irregular intervals (e.g., approximately every five minutes), in response to the user of the computing device logging into the service, and so forth.

Additionally, device-specific data is backed up to the service (act 214). The backing up of data includes identifying device-specific data to be backed up (act 216) and copying the identified device-specific data and/or a timestamp to the service (act 218). The service receives the device-specific data and/or timestamp (act 220), and stores the data and/or timestamp as associated with the device of the user from which the data is received (act 222). The received device-specific data can be new device-specific data (e.g., a file that has not been received by the service before) or replacement device-specific data (e.g., a different operating system setting value that the service replaces with a previously received value for the same operating system setting).

In one or more embodiments, the backing up of device-specific data is a rolling backup in which data (e.g., different collections) is copied to the service at different times rather than by a snapshot of all of the device-specific data being taken at a particular time and that snapshot being copied to the service. In providing the device-specific data to the service, a timestamp (e.g., date and time of day) that the device-specific data is copied is also provided to the service. As different device-specific data can be copied to the service at different times, different device-specific data can have different timestamps.

The backing up of device-specific data can occur at various intervals and/or in response to various events. For example, device-specific data can be backed up in response to a determination of low resource usage (e.g., processor usage below a threshold amount, network bandwidth usage below a threshold amount, etc.), in response to the user of the computing device logging into the service, in response to a threshold amount of time having elapsed since a check for any data having been changed in act 216 was last made, and so forth.

In one or more embodiments, the computing device (e.g., the backup module 118 of the computing device 102(1) of FIG. 1) identifies data in act 216 by checking when each collection of device-specific data was last backed up. At least some of the collections of device-specific data are then copied to the service in act 218 in the order of oldest (backed up longest ago) to newest (backed up most recently). The computing device can maintain a record of when device-specific data is changed on the computing device, and if the device-specific data in the collection has not been changed since it was last backed up then the timestamp of the current time and date can be provided to the service to indicate that the collection of device-specific data has not changed and that the copy of the collection of device-specific data that the service has is the same as on the computing device as of the current time and date. The record of when device-specific data is changed can be maintained in various manners, such as by access timestamps associated with the data (e.g., a timestamp associated with a file including the data), a separate list or database, and so forth. Alternatively, the computing device need not maintain any record of when the device-specific data in the collection was last backed up, and can provide the collection as well as the timestamp, allowing the service to store the collection and timestamp regardless of whether the device-specific data in the collection has changed, or to determine whether the data has changed and thus is to be stored.

The amount of device-specific data or number of collections that are copied to the service can vary based on different criteria, such as the size of the data, current resource usage of the computing device, and so forth. For example, a particular amount of device-specific data (e.g., one or more collections totaling at least a particular number of bytes) may be copied to the service and then additional device-specific data not copied until a particular amount of time elapses (e.g., a particular number of minutes) or a particular event occurs (e.g., resource usage of the computing device remains below a particular threshold for at least a particular amount of time).

The synchronization of common data in acts 202 and 204 can occur concurrently with the backing up of device-specific data in act 214, or alternatively the synchronization of common data in acts 202 and 204 and the backing up of device-specific data in act 214 can occur sequentially.

The process 200 can be performed for each different computing device that the user logs into the service from. For example, if the user logs into the service from his or her smartphone, tablet computer, and desktop computer, then the service synchronizes common data with each of those device, and furthermore stores device-specific data for each of those devices. In addition to storing the device-specific data in act 222, the service stores the device-specific data as associated with an indication of the device from which the device-specific data is received. This device indication can take various forms, such as an identifier of particular hardware of the device (e.g., a media access control (MAC) address of a network adapter used to access the service, a processor identifier, a hash value of identifiers of various hardware components of the device, etc.), a name of the device (e.g., assigned by a user of the device), and so forth.

It should be noted that although synchronization of common data and backing up of device-specific data are illustrated in the process 200, a user can opt out of the synchronization and/or backing up if he or she desires. Any of a variety of user inputs can be provided to opt in or out, such as selection of a menu item, copying of data to a particular folder or directory, and so forth. Thus, a computing device may synchronize common data and backup device-specific data, or alternatively may synchronize common data but not backup device-specific data, or alternatively may backup device-specific data but not synchronize common data.

Figure 3:
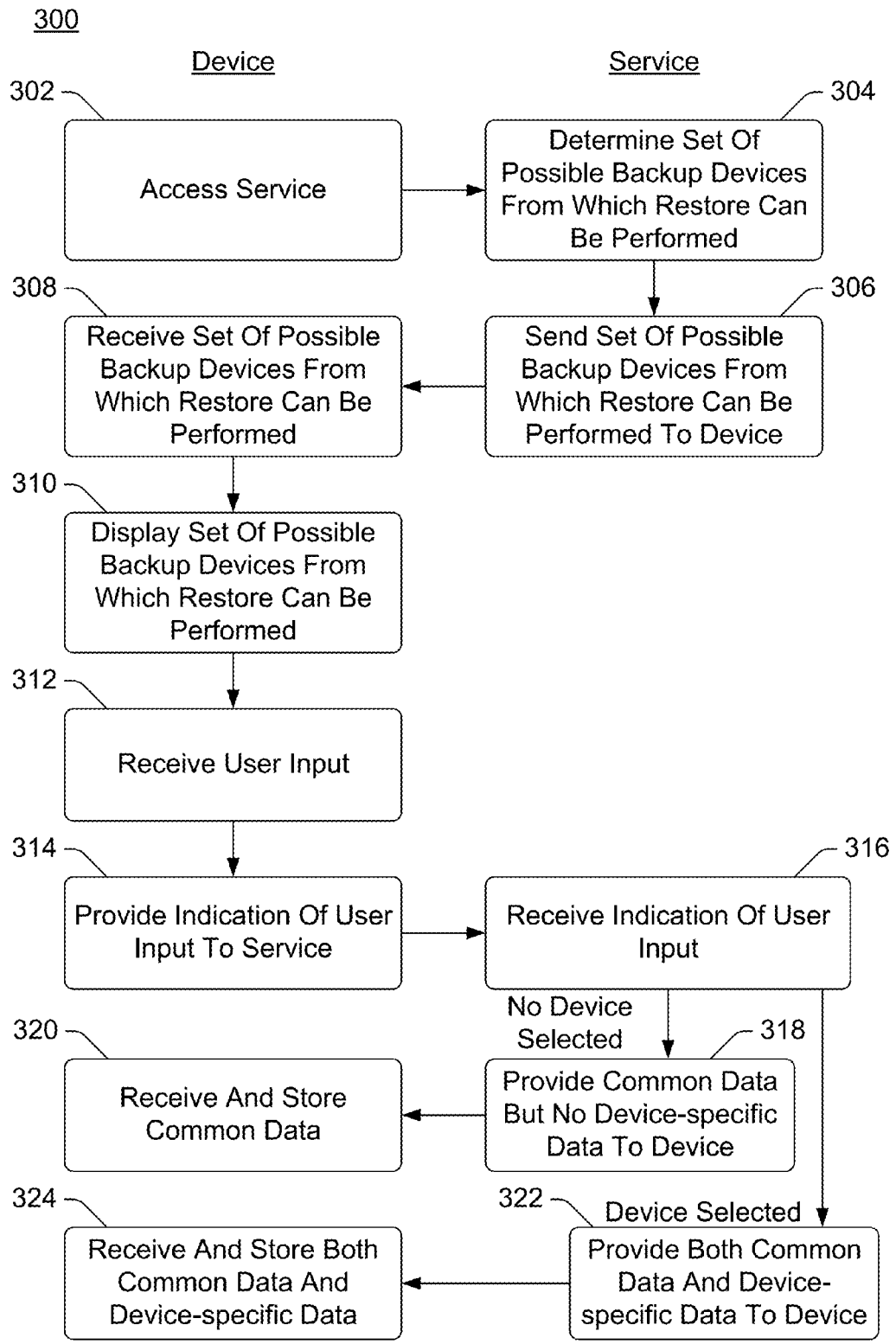
FIG. 3 is a flowchart illustrating an example process for restoring backed up data to a computing device in accordance with one or more embodiments.

FIG. 3 is a flowchart illustrating an example process 300 for restoring backed up data to a computing device in accordance with one or more embodiments. The process 300 can be implemented in software, firmware, hardware, or combinations thereof. Acts of the process 300 illustrated on the left-hand side of FIG. 3 are carried out by a device, such as a device 103 of FIG. 1. Acts of process 300 illustrated on the right-hand side of FIG. 3 are carried out by a service, such as the service 104 of FIG. 1. The process 300 is shown as a set of acts and is not limited to the order shown for performing the operations of the various acts. The process 300 is an example process for restoring backed up data to a computing device; additional discussions of restoring backed up data to a computing device are included herein with reference to different figures.

In the process 300, the computing device accesses a service (act 302). The computing device in the process 300 can be a computing device of the user from which the user has previously backed up device-specific data or alternatively another computing device (e.g., a newly acquired device of the user). In accessing the service, an indication is provided to the service that restoration of device-specific data may be desired. This indication can take various forms, such as an explicit indication (e.g., a user input requesting that device-specific data be restored to the computing device) or an implicit indication (e.g., accessing the service using a computing device from which device-specific data has not been previously received, such as a newly acquired device).

In response to the service access, the service determines a set of possible backup devices from which a restore can be performed (act 304). The set of possible backup devices are zero or more devices from which the user has backed up device-specific data. The device-specific data received from a computing device as part of the backing up of the data includes various information (e.g., operating system configuration settings) describing the device. This information describing the device can include, for example, a class or form factor of the device (e.g., laptop computer, wireless phone, desktop computer, tablet computer, game console, etc.), a name of the device (e.g., assigned by the user of the device), a visual representation of a display of the device, an identifier of a version of an operating system running on the device, and so forth.

The service (e.g., device restore management module 138 of the service 104 of FIG. 1) obtains an indication of the class or form factor of the device accessing the service, an identifier of a version of an operating system running on the device, and optionally additional information. Based on this information, the service determines which backup devices can be restored from (the device-specific data associated with which devices can be copied to the computing device). Device-specific data for some backup devices can be restored to some computing devices but not to other computing devices. For example, device-specific data backed up from a device can be restored to a different device that is the same form factor and running the same version of the same operating system. By way of another example, device-specific data backed up from a device running a particular version of an operating system may not be restored to a computing device running an older version of the operating system. By way of yet another example, device-specific data backed up from a device having a particular form factor (e.g., a desktop computer) may not be restored to a computing device having a different form factor (e.g., a wireless phone).

For a particular computing device, which backup devices can be restored from can be determined in different manners. For example, the service can be pre-configured with (or obtain from another service or device) an indication of which form factors, operating systems, operating system versions, and so forth can be restored to which other form factors, operating systems, operating system versions, and so forth. By way of another example, the service can have a particular set of rules or criteria that are applied to determine, based on the form factors, operating systems, operating system versions, and so forth, which backup devices can be restored from for a particular computing device.

Regardless of the manner in which the set of possible backup devices is determined in act 302, an indication of the set of possible backup devices from which a restore to the computing device can be performed is sent to the computing device (act 306). The indication of the set of possible backup devices includes metadata of the devices that allows the different ones of the possible backup devices to be distinguished from one another. The device metadata for a device includes device-specific data provided to the service by the device, such as a class or form factor of the device, a name of the device, a visual representation of a display of the device, an identifier of a version of an operating system running on the device, and so forth.

The visual representation of a display of the device refers to a visual representation of a particular one or more screens displayed by the device during operation of the device, such as a desktop displayed by the device, a start screen of the device, a default or startup screen displayed to the user when he or she logs onto or unlocks the device, and so forth. Such screens can oftentimes be customized by the user of the devices, and displaying the visual representation of such a screen facilitates user identification of different devices due to the user associating particular screens with particular devices. The visual representation indicates background colors and/or images of the display, the layout of tiles or icons on the display (with the colors, relative sizes, positions, and shapes of the tiles or icons), and so forth. In one or more embodiments, the visual representation of a display is a low fidelity (lower fidelity than is actually displayed by the device) version of the display that includes icons, tiles, and so forth having approximately the same color as well as relative size and shape as the high fidelity version that is actually displayed by the device. For example, the visual representation of the display can be a screenshot of the display that is reduced in size (e.g., by a factor of 50 or 100). Alternatively, the visual representation of the display can be a high fidelity version of the display.

The set of possible backup devices including device metadata is received by the computing device (act 308) and displayed (act 310). The set of possible backup devices is displayed along with at least some of the device metadata, such as the class or form factor of the device, the name of the device, the visual representation of a display of the device, the identifier of the version of the operating system running on the device, and so forth. This device metadata is displayed to facilitate the user selecting the desired backup device from which the device-specific data is to be restored to the computing device.

Figure 4:
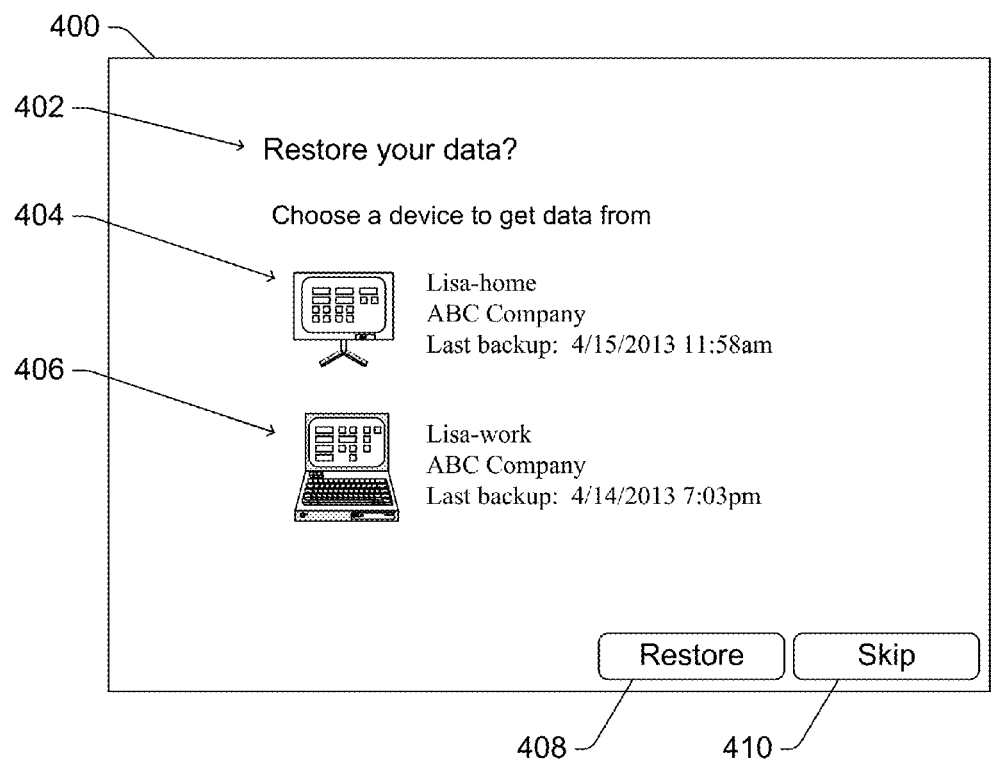
FIGS. 4 and 5 illustrate example displays of a set of possible backup devices form which a restore can be performed in accordance with one or more embodiments.

FIG. 4 illustrates an example display 400 of a set of possible backup devices from which a restore can be performed in accordance with one or more embodiments. Display 400 includes a prompt 402 identifying to the user that they can choose a device from which to restore data, and displays two backup devices 404 and 406 from which the user can have device-specific data restored. The backup device 404 is illustrated with metadata including device-specific data, such as the form factor of the device (a visual representation of a desktop monitor that represents a desktop computer), a visual representation of a display of the device, the name of the device ("Lisa-home"), the name of the company that authored the operating system running on the device ("ABC Company"), and the time and date that the backup device 404 was last backed up ("4/15/2013 11:58 am"). The backup device 406 is illustrated with metadata including device-specific data, such as the form factor of the device (a visual representation of a laptop computer that represents a laptop computer), a visual representation of a display of the device, the name of the device ("Lisa-work"), the name of the company that authored the operating system running on the device ("ABC Company"), and the time and date that the backup device 406 was last backed up ("4/14/2013 7:03 pm").

The user is thus presented with various information to facilitate selection of a backup device. For example, if the user has acquired a new laptop computer to replace his or her old laptop computer, he or she can readily identify the backup device 406 based on the displayed laptop computer form factor as the device from which he or she desires to have device-specific data restored. By way of another example, if the user has acquired a new laptop computer he or she intends for home use, he or she can readily identify the backup device 404 based on the visual representation of the backup device 404 (which he or she readily associated with his or her home desktop computer display) as the device from which he or she desires to have device-specific data restored.

The user can select one of the backup devices 404 and 406 in a variety of different manners, such as touching or clicking on one of the backup devices 404 and 406, and then touching or clicking on the restore button 408. Alternatively, the user can select to restore device-specific data from neither of backup devices 404 and 406 by selecting to not restore device-specific data, such as by touching or clicking on the skip button 410.

Figure 5:
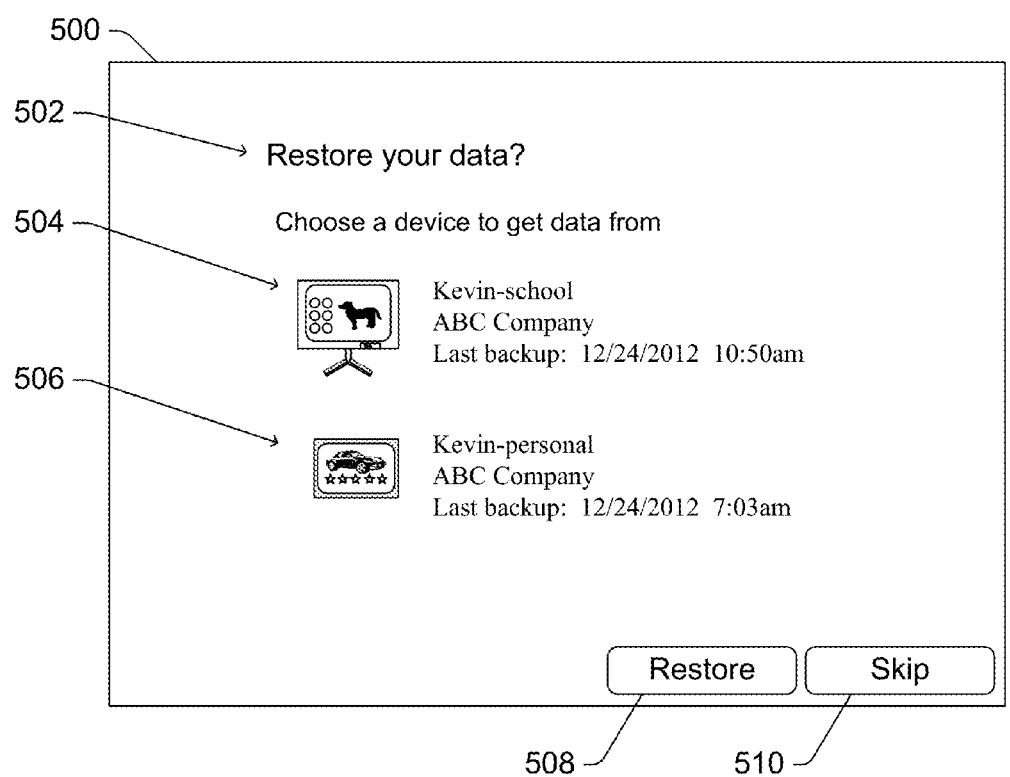

FIG. 5 illustrates an example display 500 of a set of possible backup devices from which a restore can be performed in accordance with one or more embodiments. Display 500 includes a prompt 502 identifying to the user that they can choose a device from which to restore data, and displays two backup devices 504 and 506 from which the user can have device-specific data restored. The backup device 504 is illustrated with metadata including device-specific data, such as the form factor of the device (a visual representation of a desktop monitor that represents a desktop computer), a visual representation of a display of the device, the name of the device ("Kevin-school"), the name of the company that authored the operating system running on the device ("ABC Company"), and the time and date that the backup device 504 was last backed up ("12/24/2012 10:50 am"). The backup device 506 is illustrated with metadata including device-specific data, such as the form factor of the device (a visual representation of a tablet computer that represents a tablet computer), a visual representation of a display of the device, the name of the device ("Kevin-personal"), the name of the company that authored the operating system running on the device ("ABC Company"), and the time and date that the backup device 506 was last backed up ("12/24/2012 7:03 am").

The user is thus presented with various information to facilitate selection of a backup device. For example, if the user has acquired a new tablet computer to replace his or her old tablet computer, he or she can readily identify the backup device 506 based on the displayed tablet computer form factor as the device from which he or she desires to have device-specific data restored. By way of another example, if the user has acquired a new desktop computer he or she intends for personal use, he or she can readily identify the backup device 506 based on the visual representation of the backup device 506 (which he or she readily associated with his or her personal desktop computer display) as the device from which he or she desires to have device-specific data restored.

The user can select one of the backup devices 504 and 506 in a variety of different manners, such as touching or clicking on one of the backup devices 504 and 506, and then touching or clicking on the restore button 508. Alternatively, the user can select to restore device-specific data from neither of backup devices 504 and 506 by selecting to not restore device-specific data, such as by touching or clicking on the skip button 510.

Returning to FIG. 3, a user input is received (act 312) in any of a variety of different manners as discussed above. An indication of the received user input is provided to the service (act 314), which is a user selection of a computing device from which device-specific data is to be restored, or an input to not restore device-specific data. The service receives the indication of the user input (act 316) and proceeds based on whether the user input is a selection of one of the backup devices in the displayed set of backup devices or a selection of none of the backup devices in the displayed set of backup devices.

In response to user input that is the selection of none of the backup devices in the displayed set of backup devices, common data is provided to the computing device (e.g., as part of the synchronizing discussed above) but no device-specific data is provided to the computing device (act 318). The computing device receives and stores the common data (act 320) and continues to synchronize common data with the service as discussed above. The computing device also proceeds with backing up device-specific data for the computing device to the service as discussed above.

Alternatively, a prompt may be displayed to the user to select whether he or she desires to have all common data provided in act 318, only some of the common data in act 318, or none of the common data provided in act 318. If the user desires to have only some of the common data provided in act 318, he or she provides a user input selecting which common data is to be provided in act 318. For example, the prompt may allow the user to select whether particular types of common data (e.g., personalization settings, browser favorites, etc.) are provided in act 318. If particular data is not selected by the user as to be provided in act 318, then the particular data is not provided to the computing device in act 318. Additionally, the particular data that is not selected by the user as to be provided in act 318 can be classified as device-specific data.

In response to user input that is the selection of one of the backup devices in the displayed set of backup devices, common data is provided to the computing device (e.g., as part of the synchronizing discussed above) and device-specific data is also provided to the computing device (act 322). The computing device receives and stores both the common data and the device-specific data (act 324), and continues to synchronize common data with the service as discussed above. The computing device also proceeds with backing up device-specific data for the computing device to the service as discussed above.

It should be noted that when a user logs into his or her account, the device-specific data is backed up and associated with that device. When the user selects a backup device from the set displayed in act 310, the selected backup device is deleted by the service and device-specific data is no longer associated with the selected backup device. Thus, the computing device effectively replaces the selected backup device. However, if none of the backup devices from the set displayed in act 310 is selected, then the selected backup device is not deleted by the service. Thus, if a user were to replace his or her old laptop computer with a new laptop computer and selected the old laptop computer to restore from, device-specific data for the old laptop computer would no longer be stored by the service. However, if the user were to subsequently log into his or her account with the old laptop computer and select no backup device from which device-specific data is to be restored, then the old laptop computer would be re-added by the service and device-specific data for both the old laptop computer and the new laptop computer maintained by the service.

In the discussions above, reference is made to a timestamp for the device-specific data (e.g., the date and time of day that the device-specific data is copied to the service), and that different device-specific data can have different timestamps. Thus, different device-specific data associated with a device can have different timestamps, and one of those timestamps is selected as the timestamp to display to the user (e.g., as shown in the examples of FIGS. 4 and 5 above). The timestamp can be selected in various manners, such as being the oldest timestamp (the oldest of the timestamps of the collections of device-specific data) or the youngest timestamp (the newest of the timestamps of the collections of device-specific data).

In the discussions above, reference is made to the common data and the device-specific data being associated with a user or user account. Alternatively, the common data and/or the device-specific data can be associated with a device identifier rather than a user account. In such situations, when a module of the device accesses the service, the device can be authenticated based on the identifier (optionally in combination with other passwords or secret information known to the device and the service) similar to the authentication of the user as discussed above. A record of different device identifiers that are to be associated with one another (e.g., that are owned or used by the same user) can be provided to the service, and the service can synchronize common data among the devices that are associated with one another analogous to the discussion above, and can backup device-specific data for each of the devices as discussed above. The service can also maintain a record of devices that are to be allowed to restore from other devices, allowing one device to restore device-specific data backed up by another device.

For example, an old television set top box may have a hardware identifier and the user may configure various settings for his or her old set top box. If the user exchanges the old set top box for a new set top box, the service can maintain a record (e.g., of set top box hardware identifiers) that the new set top box can restore device-specific data from the old set top box. When the user begins using his or her new set top box, the device-specific data from the old set top box is copied to his or her new set top box (e.g., automatically, or in response to user selection of the old set top box when the user is presented with an option to restore device-specific data to the new set top box).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
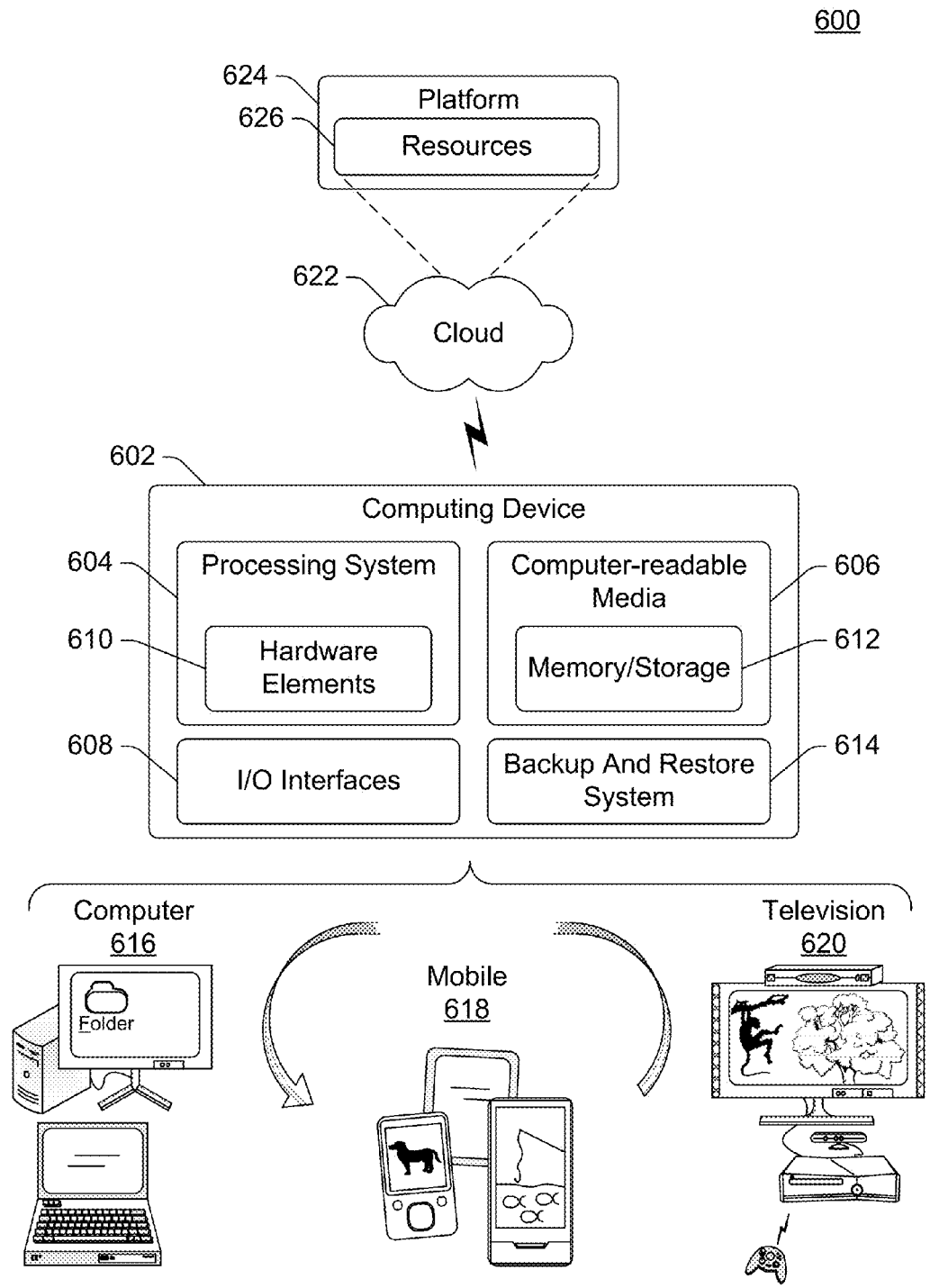
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system. The computing device 602 can be, for example, a computing device 102 of FIG. 1 or a device implementing at least part of the service 104 of FIG. 1.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a backup and restore system 614. The backup and restore system 614 provides various data backup and synchronization functionality, including functionality for synchronizing common data and backing up device-specific data as discussed above. The backup and restore system 614 can implement, for example, the synchronization module 116, the backup module 118, and the restore module 122 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    obtaining an indication of a form factor from a particular computing device;
    determining which of multiple computing devices that have been previously backed up can be restored from based on the indication of the form factor;
    providing to the particular computing device an indication of the multiple computing devices in a cloud computing environment that can be restored from and have the same form factor as the particular computing device, the indication of the multiple computing devices including for each of the multiple computing devices device metadata that allows the different ones of the multiple computing devices to be distinguished from one another, the device metadata for a computing device including data that is received from the computing device, and for each of the multiple computing devices the device metadata including a visual representation of a screenshot of a display of the computing device previously backed up from the computing device;
    receiving, from the particular computing device, a user selection of one of the multiple computing devices; and
    providing to the particular computing device device-specific data associated with the user selected one of the multiple computing devices.

2. A method as recited in claim 1, the providing an indication comprising providing an indication of only those of the multiple computing devices that can be restored from for the particular computing device.

3. A method as recited in claim 1, the visual representation of the screenshot of the display comprising a visual representation of a layout of tiles or icons on the display.

4. A method as recited in claim 3, the layout of tiles or icons on the display including the positions of the tiles or icons relative to one another, and the colors of the tiles or icons.

5. A method as recited in claim 1, for each of the multiple computing devices the device metadata comprising a visual representation of a form factor of the computing device.

6. A method as recited in claim 1, the method being implemented by a service remote from the particular computing device, the providing including providing a timestamp for each of the multiple computing devices of an oldest collection of device-specific data backed up by the computing device performing a rolling backup by copying to the service different collections of device-specific data at different times.

7. A method as recited in claim 1, further comprising providing to the particular computing device common data associated with the user regardless of which of the multiple computing devices is selected.

8. A method as recited in claim 1, further comprising, after providing the device-specific data associated with the user selected one of the multiple computing devices, receiving device-specific data from the particular computing device and storing the received device-specific data as associated with the particular computing device.

9. A method as recited in claim 1, further comprising, after providing the device-specific data associated with the user selected one of the multiple computing devices, receiving device-specific data from the user selected one of the multiple computing devices and storing the received device-specific data as associated with the user selected one of the multiple computing devices.

10. A computing device comprising:
    one or more processors; and
    a computer-readable storage device having stored thereon multiple instructions that, responsive to execution by the one or more processors, cause the one or more processors to perform acts comprising:
    providing, to a remote service, an indication of a form factor of the computing device;
    receiving, from the remote service, an indication of multiple computing devices in a cloud computing environment that have been previously backed up and have the same form factor as the computing device, the indication including for each of the multiple computing devices device metadata allowing the different ones of the multiple computing devices to be distinguished from one another by visual representations of displays of the multiple computing devices previously backed up from the multiple computing devices, each of the visual representations of the displays of the multiple computing devices including a screenshot of a respective display of the multiple computing devices;

receiving a user input;

in response to the user input being a user selection of one of the multiple computing devices, providing an indication of the user selected computing device to the remote service and receiving from the remote service device-specific data associated with the user selected one of the multiple computing devices; and receiving from the remote service common data associated with the user regardless of the user input.

11. A computing device as recited in claim 10, the user input comprising an indication that no device is to be restored from, and in response to the user input being an indication that no device is to be restored from receiving the common data from the remote service but receiving no device-specific data from the remote service.

12. A computing device as recited in claim 10, the user input comprising an indication that no device is to be restored from, and in response to the user input being an indication that no device is to be restored from:

receiving a user selection of which common data to receive from the remote service; and receiving the user selected common data from the remote service but receiving no device-specific data from the remote service and receiving no non-selected common data from the remote service.

13. A computing device as recited in claim 12, the receiving an indication comprising receiving an indication of only those computing devices that can be restored from for the computing device.

14. A computing device as recited in claim 10, the screenshot of the respective display comprising a visual representation of a layout of tiles or icons on the respective display.

15. A computing device as recited in claim 14, the layout of tiles or icons on the respective display including the positions of the tiles or icons relative to one another, and the visual representation of the respective display further comprising a visual representation of the colors of the tiles or icons.

16. A computing device as recited in claim 12, for each of the multiple computing devices the device metadata comprising a visual representation of the form factor of the computing device.

17. A computing device as recited in claim 12, the acts further comprising, after receiving the device-specific data associated with the user selected one of the multiple computing devices, backing up device-specific data associated with the computing device by providing device specific data for the user to the remote service.

18. A method comprising:

obtaining an identifier of a version of an operating system from a particular computing device in a cloud computing environment;

determining which of multiple computing devices that have been previously backed up can be restored from based on the identifier of the version of the operating system;

providing to the particular computing device an indication of the multiple computing devices that can be restored from and have the same version of the operating system as the particular computing device, the indication of the multiple computing devices including for each of the multiple computing devices device metadata that allows the different ones of the multiple computing devices to be distinguished from one another, the device metadata for a computing device comprising a visual representation of a display of the computing device previously backed up from the computing device, the visual representation of the display comprising a visual representation of the positions of tiles or icons of the display relative to one another as well as a visual representation of the colors of the tiles or icons;

receiving, from the particular computing device, a user input;

in response to the user input being a user selection of one of the multiple computing devices, providing to the particular computing device both device-specific data associated with the user selected one of the multiple computing devices and common data associated with the user; and in response to the user input being an indication that no device is to be restored from, providing to the particular computing device common data associated with the user but no device-specific data.

19. A method as recited in claim 1, the visual representation of the display comprising a low fidelity representation of the display.

20. A computing device as recited in claim 10, the visual representation of the display comprising a low fidelity representation of the display.

* * * * *